US011260729B2

(12) United States Patent
Fisker et al.

(10) Patent No.: US 11,260,729 B2
(45) Date of Patent: Mar. 1, 2022

(54) AUTOMOBILE HAVING RETRACTABLE REAR QUARTER WINDOWS

(71) Applicant: Fisker Inc., Los Angeles, CA (US)

(72) Inventors: Henrik Fisker, Los Angeles, CA (US); Martin Welch, Hermosa Beach, CA (US)

(73) Assignee: Fisker Inc., Los Angeles, CA (US)

( * ) Notice: Subject to any disclaimer, the term of this patent is extended or adjusted under 35 U.S.C. 154(b) by 0 days.

(21) Appl. No.: 16/951,981

(22) Filed: Nov. 18, 2020

(65) Prior Publication Data

US 2021/0155084 A1 May 27, 2021

Related U.S. Application Data

(60) Provisional application No. 62/939,628, filed on Nov. 24, 2019.

(51) Int. Cl.
*B60J 1/00* (2006.01)
*B60J 1/17* (2006.01)
*B21D 53/74* (2006.01)
*B60J 10/77* (2016.01)
*B60J 10/00* (2016.01)

(52) U.S. Cl.
CPC .............. *B60J 1/17* (2013.01); *B21D 53/74* (2013.01); *B60J 10/45* (2016.02); *B60J 10/77* (2016.02)

(58) Field of Classification Search
CPC .............. B60J 1/17; B60J 10/45; B60J 10/77
USPC ........................ 296/146.1, 146.15, 146.16
See application file for complete search history.

(56) References Cited

U.S. PATENT DOCUMENTS

| 3,419,304 | A  | * | 12/1968 | Ssangimino | ......... | B62D 47/003 |
| | | | | | | 296/99.1 |
| 6,220,650 | B1 | * | 4/2001  | Davis      | ............ | B60J 10/78 |
| | | | | | | 296/146.16 |
| 7,097,229 | B1 | * | 8/2006  | Chernoff   | ............... | B60J 5/047 |
| | | | | | | 296/146.1 |
| 7,175,226 | B1 | * | 2/2007  | Queener    | .................. | B60J 1/17 |
| | | | | | | 296/146.16 |
| 7,367,615 | B1 | * | 5/2008  | Fallis, III | ................. | B60J 1/17 |
| | | | | | | 296/216.01 |
| 7,410,198 | B1 | * | 8/2008  | Queener    | ................. | B60J 1/17 |
| | | | | | | 296/216.01 |
| 8,454,077 | B2 | * | 6/2013  | Charnesky  | .............. | B60J 1/17 |
| | | | | | | 296/146.2 |

(Continued)

FOREIGN PATENT DOCUMENTS

WO WO-2018066586 A1 * 4/2018 ............... B60J 1/17

*Primary Examiner* — Jerry E Redman
(74) *Attorney, Agent, or Firm* — Finnegan, Henderson, Farabow, Garrett & Dunner LLP

(57) ABSTRACT

An automobile includes a body side panel including: a first pillar disposed rearward of a door of the automobile; a second pillar disposed rearward of the first pillar; an interior panel connecting the first pillar and the second pillar; a rear quarter panel attached to the exterior of the body side panel and forming a cavity between the rear quarter panel and the interior panel; and a retractable window disposed between the first pillar and the second pillar; wherein the retractable window is configured to move between a first position and a second position, the first position being defined by a roof of the automobile, the first pillar, and the second pillar, and the second position being inside the cavity.

13 Claims, 5 Drawing Sheets

(56) References Cited

U.S. PATENT DOCUMENTS

| | | | |
|---|---|---|---|
| 2002/0008396 A1* | 1/2002 | De Gaillard | B60P 3/423 296/26.09 |
| 2003/0116994 A1* | 6/2003 | Richtor | E05F 15/42 296/146.16 |
| 2004/0090092 A1* | 5/2004 | de Gaillard | B60P 3/42 296/222 |
| 2007/0138830 A1* | 6/2007 | Isaac | B60J 1/12 296/146.16 |
| 2011/0192088 A1* | 8/2011 | Zellmer | E05F 15/73 49/358 |
| 2012/0090240 A1* | 4/2012 | Zellmer | E05F 15/40 49/31 |
| 2012/0280531 A1* | 11/2012 | Charnesky | E05C 19/002 296/146.1 |
| 2015/0282346 A1* | 10/2015 | Ganim | G06Q 30/0265 361/807 |
| 2017/0204648 A1* | 7/2017 | Rojas | E05F 15/603 |
| 2017/0362878 A1* | 12/2017 | Gage | E05F 15/75 |
| 2018/0126950 A1* | 5/2018 | Alderman | H04W 4/40 |

* cited by examiner

AUTOMOBILE HAVING RETRACTABLE REAR QUARTER WINDOWS

TECHNICAL FIELD

The present disclosure relates to the field of body structure design for automobiles, and more specifically, for automobile bodies having a retractable rear quarter window.

BACKGROUND

Early car designs required car manufacturers to assemble many small parts to create a vehicle body. While these small parts were easily manufactured, this method led to long bills of materials for vehicle assembly, complex supply chains to manage the many fasteners and individual pieces required to make up a vehicle body. In addition, variations through each stage of the manufacturing and assembly processes often led to inconsistent and poor quality in finished vehicles, such as wide or non-parallel gaps between body panels or water incursion into passenger areas. Further, intricate assembly instructions and procedures for the multiple parts increased manufacturing flaws and reduced manufacturing efficiency, increasing overall vehicle cost.

Car manufacturers, therefore, transitioned to monobody and unibody designs, wherein large portions of the vehicle body are stamped from a single piece of metal. These techniques require large presses capable of forming the complex bends required to give sufficient strength to the vehicle to protect passengers. Manufacturers made substantial investments in molds and presses to manufacture monobody designs, simplify manufacture of vehicle bodies, reduce the number of required parts, and reduce manufacturing cost. Stamped or cast monobodies typically provided greater consistency than bodies assembled from many individual parts.

In addition, the trend toward monobody or unibody designs allowed manufacturers greater flexibility in vehicle design. For example, prior to monobodies and unibodies, vehicle designers had to include support structures and provide sufficient space within the panels to allow a welder and tools sufficient space and flexibility to create strong welds. Monobodies and unibodies, however, allowed complex stamped or cast convolutes, curves, and other shapes that sufficient strength without requiring hidden or complex welds. By removing these manufacturing constraints, designers gained flexibility to craft the more complex, more aerodynamic, and stronger vehicles that are common today. Further, due to the reduction in parts, monobodies reduced vehicle weight, improving performance. Monobody and unibody designs also reduced the number of steps required for painting, as the entire body could be painted in a single step rather than painting individual components. This further reduced or eliminated potential damage to parts and finish during handling and assembly. Further, the repeatability of monobody stamping streamlined quality checking, quality assurance, and trim fitting processes, while also reducing part rejection rates.

Traditional monobodies are necessarily designed to keep water on the outside surfaces and eliminate inboard wet areas in order to prevent corrosion. Thus, to stop damage from standing water that may enter the cavities, cavities between layers of monobodies are designed to remain dry, thereby. This is accomplished by establishing a wet/dry line that follows the outer surface of the body. This wet/dry line delineates areas exposed to water from areas not exposed to water. Vehicle designers may also maintain these areas dry to provide a buffer region which reduces road noise.

Monobody designs, however, result in unutilized and inaccessible spaces in cavities between panels of the monobody. The boundaries of the cavities are sealed to keep the wet/dry line on the outer surface or designed to enable complex stamping or casting methods. This wasted space precludes the addition of useful features, such as wiring, motors, speakers, lights, or window recesses.

Thus, there is a need for novel automobile designs and manufacturing methods that provide at least some of the benefits of monobody design without the detrimental underutilization of space inherent in traditional monobody designs. This enables use of these unutilized spaces to improve passenger comfort, enjoyment, and vehicle aesthetics, all while reducing vehicle manufacturing costs.

SUMMARY

In one embodiment, an automobile is disclosed. The automobile includes a body side panel comprising: a first pillar disposed rearward of a door of the automobile; a second pillar disposed rearward of the first pillar; an interior panel connecting the first pillar and the second pillar; a rear quarter panel attached to the exterior of the body side panel and forming a cavity between the rear quarter panel and the interior panel; and a retractable window disposed between the first pillar and the second pillar; wherein the retractable window is configured to move between a first position and a second position, the first position being defined by a roof of the automobile, the first pillar, and the second pillar, and the second position being inside the cavity.

In another embodiment, a method of manufacturing an automobile is disclosed. The method includes stamping a body side panel including: a first pillar disposed rearward of a door of the automobile; a second pillar disposed rearward of the first pillar; and an interior panel connecting the first pillar and the second pillar; stamping a rear quarter panel; mounting a retractable window on guides disposed on the first pillar and the second pillar; mounting a window drive motor in a cavity defined by the body side panel and rear quarter panel; and affixing the rear quarter panel to the body side panel.

In another embodiment, a system for performing a global opening operation of the moveable vehicle glazing is disclosed. The system comprises a receiver configured to receive an input signal; a processor configured to identify an initiation code in the input signal; a first motor that retracts a passenger door window; a second motor that retracts a retractable window located between a first pillar disposed rearward of a door of an automobile and a second pillar disposed rearward of the first pillar; and a signal generator activating the first and second motors.

BRIEF DESCRIPTION OF THE DRAWINGS

The accompanying drawings, which are incorporated in and constitute part of this disclosure, together with the description, illustrate and explain the principles of various exemplary embodiments of the disclosure.

DETAILED DESCRIPTION

Reference will now be made to exemplary embodiments of the present disclosure, examples of which are illustrated in the accompanying drawings. Wherever possible, the same reference numbers are used to refer to the same or like parts.

The present disclosure seeks to resolve the constraint that traditional monobody construction prohibits use of cavities interior of monobody surfaces. For instance, to prevent water intrusion, cavities formed between traditional monobody surfaces are typically sealed. A line delineating wet areas from dry areas, known as a wet/dry line, follows the outer surface of a monobody. The interior cavities, thus, remain empty, or, in some cases, are filled with immobile objects such as insulation.

The present disclosure provides monobody designs that dispose the wet/dry line inboard of prior known designs, such that a cavity is outside the wet/dry line. As a result, the cavity may house moving components, such as a retractable window, despite added complexity of assembly, manufacturing, and parts management, and necessary re-location and certification of hardware fastening points for seatbelts that would typically be connected in the cavity.

Figure 1A:
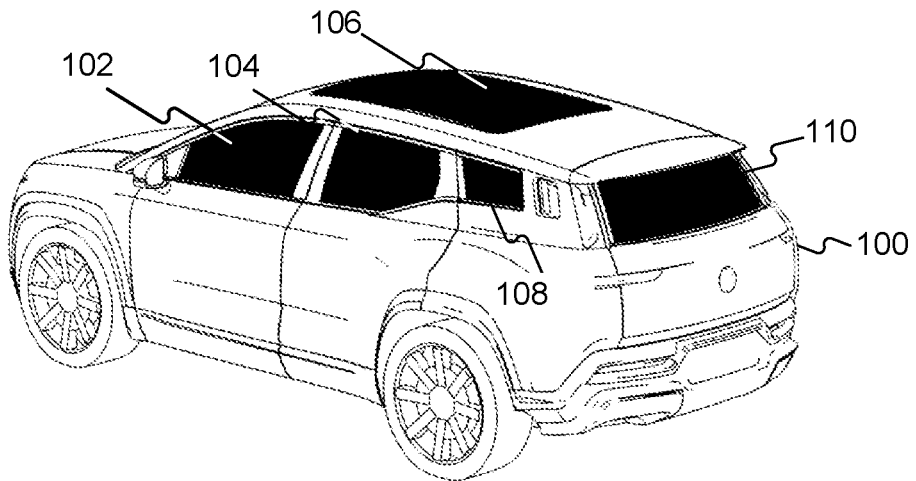
FIG. 1A illustrates a global close of windows on a vehicle, consistent with the present disclosure.

FIG. 1A illustrates a global movement of retractable glazing on a vehicle, consistent with the present disclosure. Vehicle 100 comprises multiple openings having retractable glazing, including passenger door openings 102 and 104, sunroof opening 106, rear quarter openings 108, and tailgate opening 110. Vehicle 100 in FIG. 1A has retractable glazing extended to cover corresponding openings, also known as a global close position. Vehicle 100 in FIG. 1B has retractable glazing retracted in the corresponding openings, also known as a global open position. Global open position, including retracting the rear lift-gate and quarter openings 108 may be referred to as a "California mode." Rear tail-gate or lift-gate opening has been discouraged due to the potential entry into the vehicle of exhaust fumes. In some embodiments, vehicle 100 may be an electric vehicle in which exhaust fumes from combustion are not generated, preventing exhaust fumes from traveling from an exhaust pipe of vehicle 100 through the rear lift-gate or tail-gate opening and into the cabin. In conventional vehicles, the windows in the rearmost row of a multi-row passenger vehicle typically had fixed glazing that was not retractable. In embodiments of the present invention, vehicle 100 may include a row of seats between the rear quarter openings 108, such that occupants of the rear row have access to an window that opens. This may be particularly beneficial for children when the rear quarter openings are small, such that children may open the windows for without the risk of a child falling out.

Figure 1B:
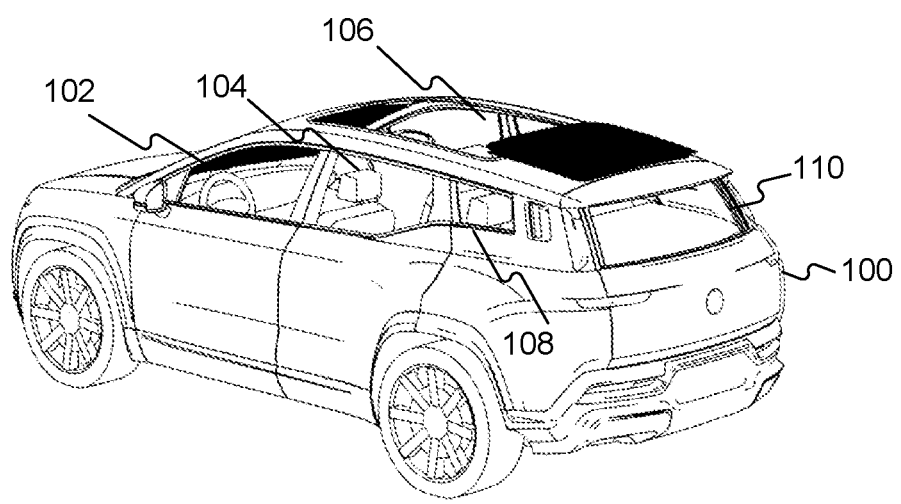
FIG. 1B illustrates a global open of windows on a vehicle, consistent with the present disclosure.

FIG. 1B illustrates a global open of windows on a vehicle, consistent with the present disclosure. In global open position, windows corresponding to openings 102 and 104 are retracted into passenger doors, the window of sunroof opening 106 is retracted rearwards. The window of tailgate or liftgate opening 110 is retracted into the tailgate or liftgate of vehicle 100. In FIG. 1B sunroof is illustrated in retracted position on the roof of vehicle 100. Persons of ordinary skill would understand that retracted sunroof glazing may be disposed on the exterior surface of roof, into the roof structure, or along interior surface of roof. Further, as shown in FIG. 1B, the global open position consistent with embodiments of the present disclosure includes retracting a window disposed in rear quarter opening 108. As will be described herein, the window of rear quarter opening 108 retracts into a cavity formed between an inner surface and an outer surface of body side panel of vehicle 100.

Figure 2A:
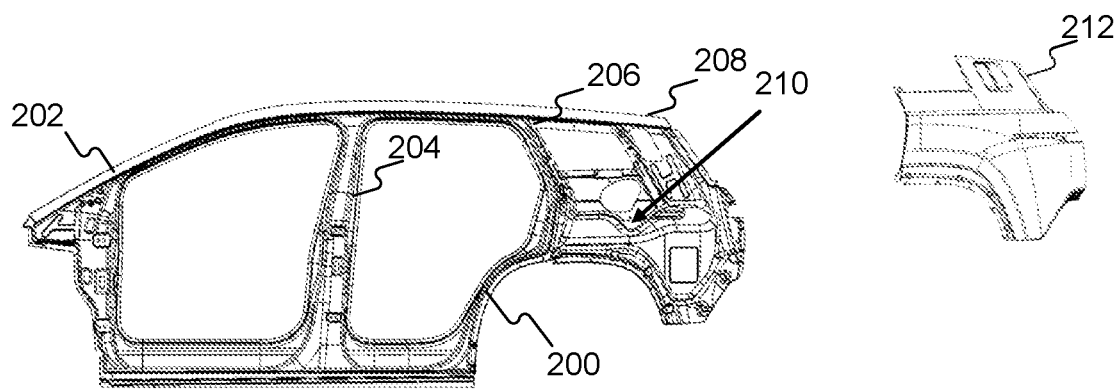
FIG. 2A illustrates a disassembled side body, consistent with the present disclosure.

FIG. 2A illustrates a disassembled side body, consistent with the present disclosure. Body side panel 200 forms the frame of doors and the rear quarter window. Body side panel 200 comprises an A pillar 202 forming the front edge of a front door frame, as well as supporting a windshield. B pillar 204 is located rearward of the front door and provides a rear support for the front door and a front support for a rear door. C pillar 206 is located rearward of B pillar 204 and rearward of the rear door. C pillar 206 provides a rear support for the rear door, and a front support for a rear quarter window. A D pillar 208 forms a support for a tailgate. Interior panel 210 connects C pillar 206 and D pillar 208. Interior panel 210 may provide structural support to the vehicle body, as well as mounting points for hardware, seatbelts, and wiring. As embodied as illustrated in FIG. 2A, body side panel 200 may be stamped or molded from a single piece of metal. As illustrated in the embodiment shown in FIGS. 2A and 2B, body side panel 200 is formed as a single panel not including rear quarter panel 212. The depicted embodiment further comprises rear quarter panel 212. FIGS. 2A (unassembled) and 2B (assembled position) illustrate rear quarter panel 212. Rear quarter panel 212 may also be stamped or molded from a single piece of metal.

In some embodiments, such as for a two-door vehicle (coupe), body side panel 200 may include only A pillar 202, B pillar 204, and C pillar 206. In addition, some embodiments, such as busses or limousines, may have multiple B pillars 204, framing multiple sets of doors or windows. The two rearmost pillars may define an opening for a rear quarter window, such that a retractable window may be disposed between a first pillar and a second pillar. For example, in a vehicle such as an SUV, the first of the two rearmost pillars may be a C-pillar, and the second of the two rearmost pillars may be a D-pillar. Alternatively, in vehicles such as a sports coupe, the first pillar may be a B-pillar, and the second pillar may be a C-pillar.

Figure 2B:
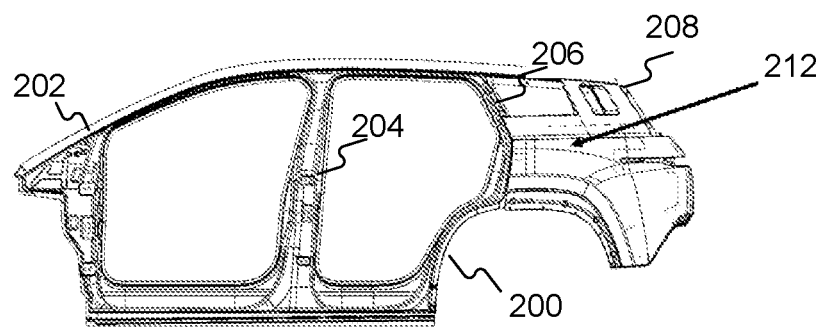
FIG. 2B illustrates an assembled side body, consistent with the present disclosure.

FIG. 2B illustrates an assembled side body, consistent with the present disclosure. In the assembled side body, rear quarter panel 212 is affixed to an exterior of body side panel 200. In the embodiment shown, rear quarter panel 212 is attached so as to overlap interior panel 210. Rear quarter panel 212 is attached to an exterior surface of body side panel 200, in relation to the passenger compartment of body panel 200 such that a cavity is formed between rear quarter panel 212 and interior panel 210 of body side panel 200. For example, in some embodiments, rear quarter panel 212 may be disposed a distance from interior panel 210, or at least partially concave away from the passenger compartment, or may be less convex toward the passenger compartment than interior panel 210, to form a space between interior panel 210, and rear quarter panel 212. Rear quarter panel 212 may be attached to body side panel 200 using snaps, welds, glue, or any other suitable fastening technique. In addition, because the wet/dry line of the assembled side body lies inside of rear quarter panel 212, the junction between rear quarter panel 204 and body side panel 200 may provide drainage holes to ensure that any water entering the cavity formed between interior panel 201 and rear quarter panel 212 does not collect and cause corrosion.

Because rear quarter panel 212 is manufactured separately from body side panel 200, rear quarter panel 212 may undergo different manufacturing processes. For example, in some embodiments, rear quarter panel 212 may be made from different material than body side panel 200, such as fiberglass, carbon fiber, or any suitable material, reducing weight. Further, rear quarter panel 212 may be painted prior to affixing rear quarter panel 212 to body side panel 200. In some embodiments, rear quarter panel 212 may be fitted to body side panel 200, for instance temporarily, during the vehicle assembly process to protect painted surfaces of the body side panel 200 from accidental damage. Rear quarter panel may then be permanently fixed after the risk of damage has passed, for instance, in a final assembly or cosmetic finishing phase. In this way, should damage occur, a vehicle manufacturer could swap a damaged rear quarter panel 212 with a new rear quarter panel 212, rather than repairing or repainting a larger, damaged body side panel 200, or applying temporary protection to body side panel 200 prior to assembly, thereby reducing costs and assembly time.

Masking and painting in multiple colors is time consuming and costly. Because traditional monobodies are formed in a single piece, monobodies are typically painted a single color. When rear quarter panel 212 is painted prior to affixing, it may be painted a different color than corresponding body side panel 200. Alternatively, rear quarter panels made of composite materials may be treated with different chemicals. This may allow manufacturing vehicles with color accents by providing rear quarter panels 212 displaying a different color than corresponding body side panel 200. This also provides customers with additional color accent options. For instance, rather than being limited to a two color paint scheme, such as a first color on a car roof and a second color on other surfaces, customers may now choose a third color for the rear quarter panels 212, or choose two different colors for each of the two rear quarter panels 212, with reduced cost. In addition, manufacturers may also provide vehicles with different colors for any of the hinged panels, such as doors, hoods, and trunks, or hang on parts, such as fenders, in addition to the rear quarter panels 212. This flexibility may enable painting the body a single color and then permitting color choice by the customer for quarter panels, doors, tailgates, and other 'hang on' components including fenders, panels, etc. Each of these components may be painted and affixed separately to the body side panels 200, empowering customer creativity when purchasing a new car while reducing manufacturing costs.

Further, separate assembly and painting allows corrosion prevention chemicals to be applied to inboard cavities, including the cavity formed between interior panel 210 and rear quarter panel 212. Separate rear quarter panel production may reduce corrosion of vehicles in comparison to traditional monobody designs, because manufacturers cannot thoroughly treat cavities in traditional monobodies.

Figure 3A:
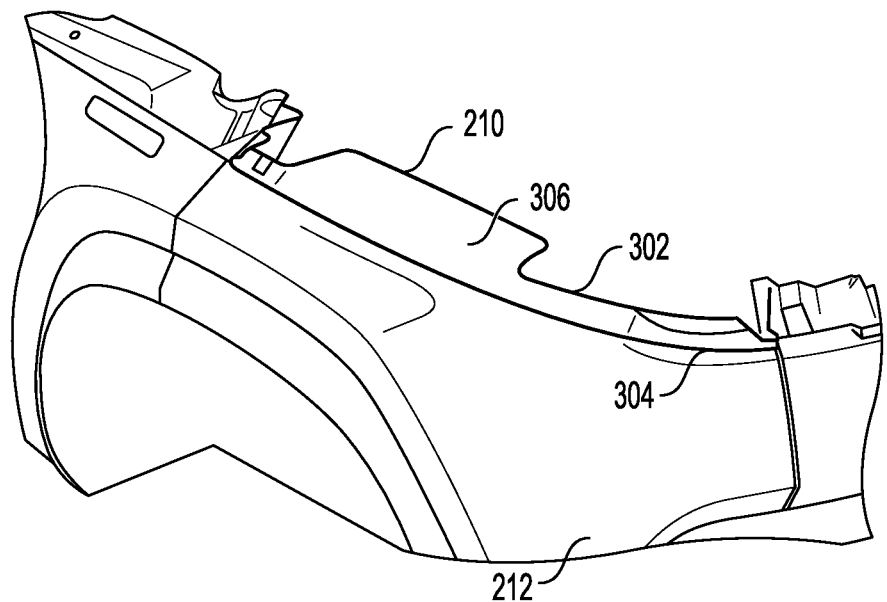
FIG. 3A illustrates a horizontal cross section of an assembled side body, consistent with the present disclosure.

FIG. 3A illustrates in orthogonal view a transverse cross-section of an assembled side body, consistent with the present disclosure. In FIG. 3A, line 304 represents the cross section of rear quarter panel 212, and line 302 represents the cross section of interior panel 210. Cavity 306 is formed between rear quarter panel 212 and interior panel 210.

Figure 3B:
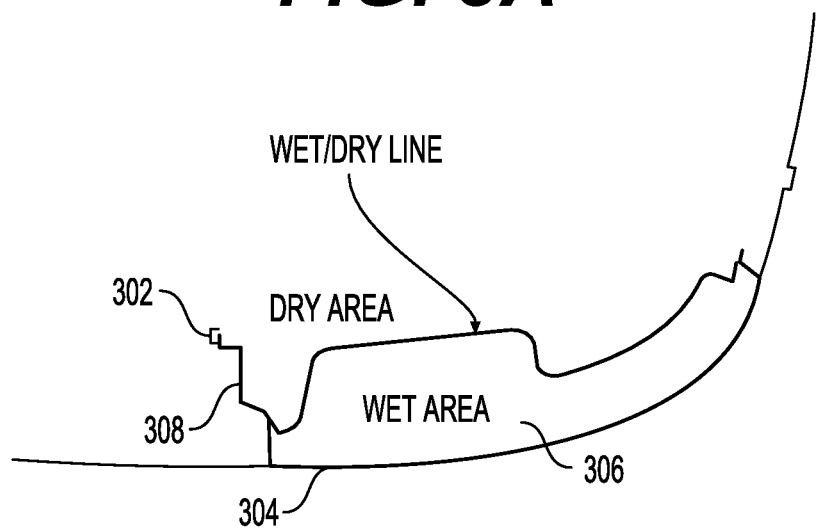
FIG. 3B illustrates a planform view of an assembled side body, consistent with the present disclosure.

FIG. 3B illustrates a transverse cross-section in top plan view of the portion of assembled side body shown in FIG. 3A, consistent with the present disclosure. FIG. 3B further illustrates the shape of cavity 306. As shown, a wet/dry line defined by line 302 lies interior of rear quarter panel 212 delineated by line 304. Thus, cavity 306 is an inboard wet area that may house moving features that are exposed to water, including retractable glazing. Additionally, line 304 showing the shape in transverse section of rear quarter panel 212 mates with line 302 depicting the corresponding shape of interior panel 210. Further, in some embodiments, rear quarter panel 212 may stop at outer surface of pillar 308, such that a passenger door contacts interior panel 210 but not rear quarter panel 212.

Figure 4A:
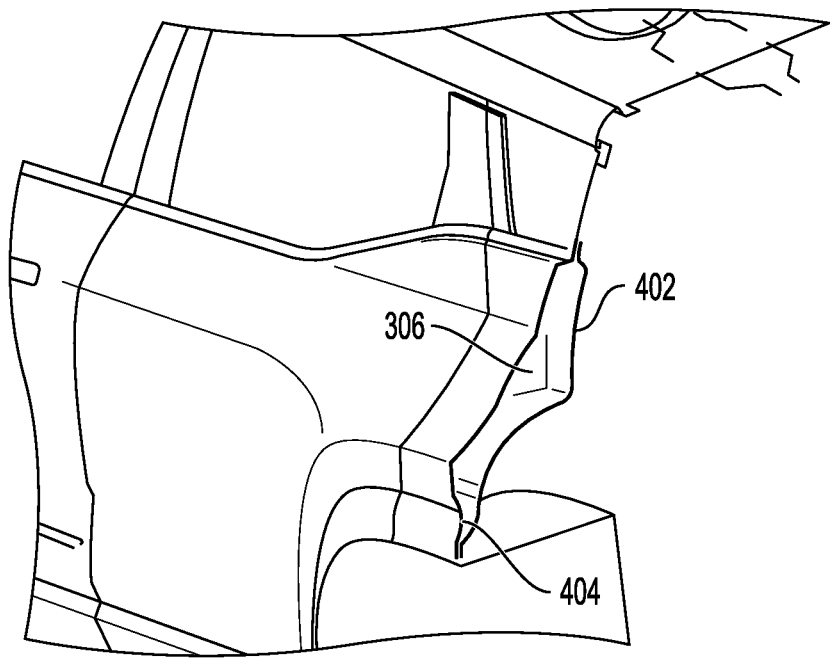
FIG. 4A illustrates a vertical cross section of an assembled side body consistent with the present disclosure.

FIG. 4A illustrates a vertical cross-section shown from the rear of vehicle of the rear quarter panel area of an assembled side body, consistent with the present disclosure. Line 402 depicts the vertical shape of a section of interior panel 210, while line 404 shows the vertical shape of a section of rear quarter panel 212. FIG. 4A further illustrates cavity 306.

Figure 4B:
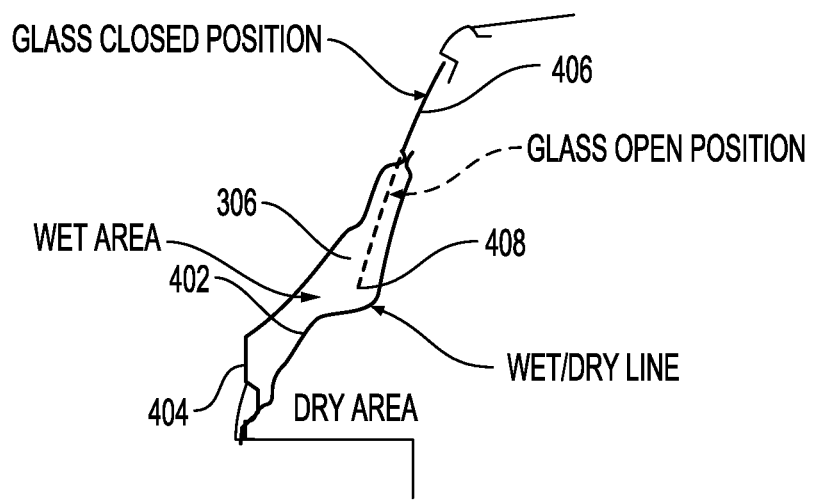
FIG. 4B illustrates a vertical cross section including a window path, consistent with the present disclosure.

Further, FIG. 4B depicts the shape in vertical cross-sectional of retractable glazing illustrating window path, consistent with the present disclosure. Retractable glazing may follow a window path having two positions. In a first (extended) position 406, the window is extended upward into a space defined by roof of an automobile, a first pillar, and a second pillar. In a second (retracted) position 408, window descends inside cavity 306. Guides may be installed on a first pillar and a second pillar to prevent the window from traveling fore and aft of the vehicle and to retain window in the desired position. Additionally, a seal may be mounted between the body side panel and retractable glazing to prevent water from entering past the wet/dry line formed by the outer surface of interior panel 210 of the body side panel.

In some embodiments, a motor may be disposed in cavity 306. The motor may power movement of the retractable glazing between a first position and a second position. Wiring for powering and controlling motor may be routed into cavity 306 through sealed holes in interior panel 210. The motor may be mounted onto interior panel 210, such that rear quarter panel 212 acts as a protective cover. Alternatively, the motor may be mounted onto rear quarter panel 212 for ease of removal and maintenance. Cavity 306 may also house linkages connecting the motor to the retractable window.

Figure 5:
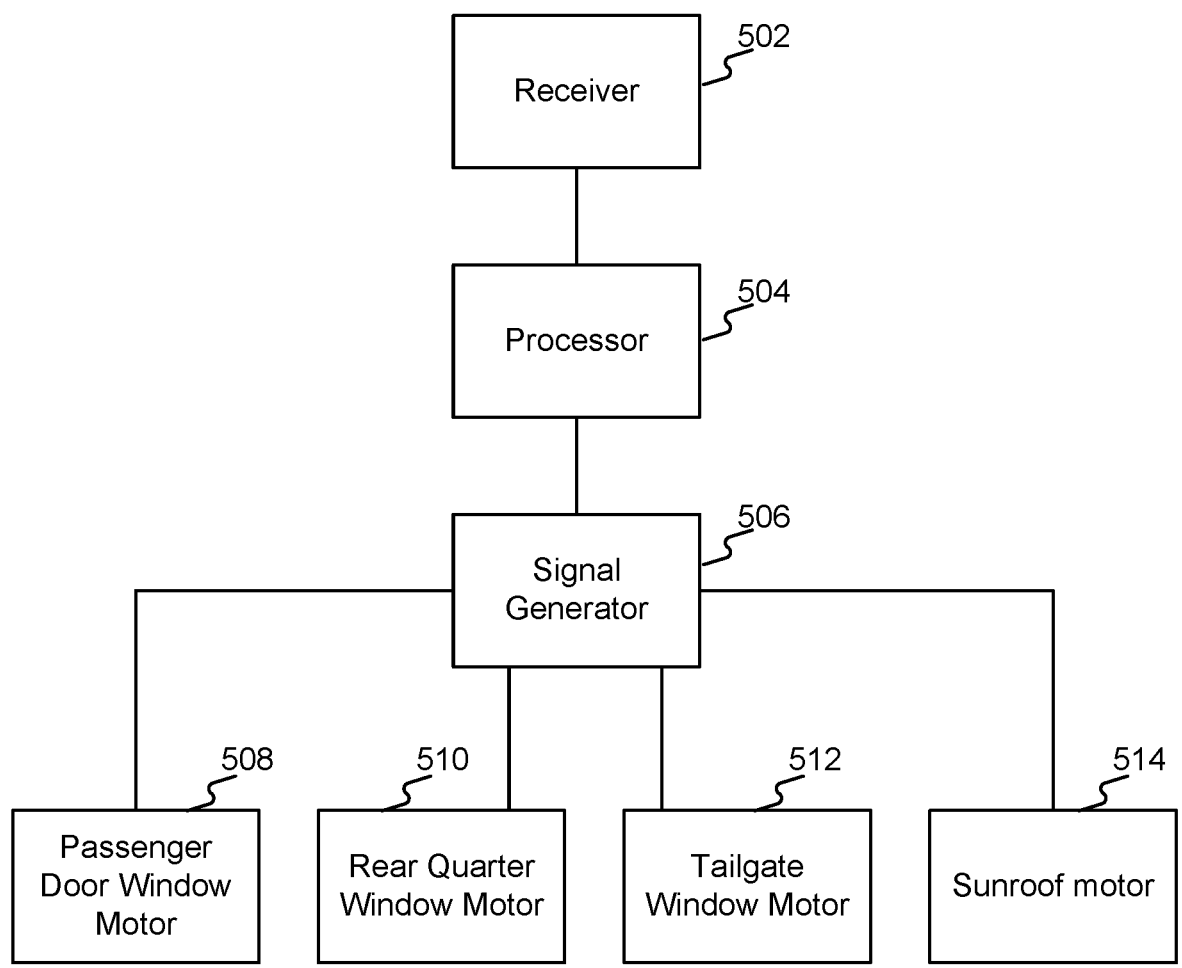
FIG. 5 illustrates a control system for global opening and closing operations, consistent with the present disclosure.

A vehicle may also comprise a control system to perform global opening and closing operations, as illustrated in FIG. 5. As embodied herein, a global opening operation opens all moveable windows in a vehicle, such as windows on each passenger door, a tailgate window, a sunroof, and a retractable window disposed between a first pillar and a second pillar. A global closing operation closes all moveable windows. System 500 of FIG. 5 comprises a receiver 502, a processor 504, and a signal generator 506.

Receiver 502 may be configured to receive an input signal, such as a signal to perform a global open or global close operation. Receiver 502 may be connected to a button, and the input signal may be generated when a user depresses the button or other actuator switch. The button may be located in the passenger compartment of the vehicle and connected to the receiver by wiring. Alternatively and/or additionally, receiver 502 may comprise an antenna, and the button may be disposed on a key fob. The key fob may generate and relay the input signal to the antenna of the receiver via radio waves or other electromagnetic emissions to the antenna when a user pushes a button on the key fob.

Further, receiver 502 may be connected, either wirelessly or with a wire, to a touchscreen, such as a dashboard touchscreen. The touchscreen may generate the input signal when a user selects a field on the touchscreen to initiate a global close or global open operation.

Processor 504 may be configured to identify an initiation code in the input signal. The input signal may be encrypted, such as in the case of a wireless transmission from a key fob, and processor 504 may decrypt the input signal to identify the initiation code. Further, the initiation code may be the closing of a circuit connected to a physical button in the vehicle, or a message generated by the touchscreen.

Processor 504 may then cause signal generator 506 to send signals to activate one or more motors in order to raise or lower windows. The signal generator may send a signal by closing a power circuit to a motor for a predetermined period of time, and may synchronize motor activation so that windows raise or descend together. The signal generator may also reverse the polarity of the circuit to reverse the direction of the motor. Alternatively, motors may have internal circuitry to control rotation speed and direction, as well as resistance sensors to determine when an accompanying window has hit a travel limit, such as a top frame or an obstacle.

System 500 also includes motors that retract and extend each moveable window of a vehicle. For instance, system 500 may include one or more passenger door window motors 508 for front and rear doors, one or more rear quarter window motors 510 powering retractable windows located between a first pillar disposed rearward of a door of an automobile and a second pillar disposed rearward of the first pillar, one or more tailgate window motors 512, and one or more sunroof motors 514.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. An automobile comprising:
    a body side panel comprising:
        a first pillar disposed rearward of a door of the automobile;
        a second pillar disposed rearward of the first pillar; and
        an interior panel connecting the first pillar and the second pillar;
    a rear quarter panel attached to an exterior of the body side panel and forming a cavity between the rear quarter panel and the interior panel;
    a retractable window disposed between the first pillar and the second pillar, the retractable window being configured to move between a first position and a second position, the first position being bounded by a roof of the automobile, the first pillar, and the second pillar, and the second position being inside the cavity;
    one or more additional windows; and
    a control system that performs a global opening operation when a user initiates an input signal, the global opening operation comprising:
        retracting the retractable window disposed between the first pillar and the second pillar and
        retracting the one or more additional windows in substantial synchrony with the retractable window.

2. The automobile of claim 1, wherein the first pillar is a C-pillar, and the second pillar is a D-pillar.

3. The automobile of claim 1, wherein the first pillar is a B-pillar, and the second pillar is a C-pillar.

4. The automobile of claim 1, further comprising:
    a seal between the body side panel and the retractable window.

5. The automobile of claim 1, further comprising:
    a passenger door window;
    a tailgate window; and
    a sunroof.

6. The automobile of claim 5, wherein the global opening operation further comprises:
    retracting the passenger door window, the tailgate window, and the sunroof.

7. The automobile of claim 1, wherein the input signal is initiated by a button is disposed on a remote key fob.

8. The automobile of claim 1, further comprising a motor disposed in the cavity and powering movement of the retractable window between the first position and the second position.

9. The automobile of claim 1, wherein the rear quarter panel is painted in a different color than the body side panel.

10. The automobile of claim 1, further comprising:
    a receiver configured to receive the input signal;
    a processor configured to identify an initiation code in the input signal;
    a first motor that retracts a passenger door window;
    a second motor that retracts the retractable window disposed between the first pillar and the second pillar; and
    a signal generator activating the first and second motors.

11. The automobile of claim 1, further comprising:
    a third motor that retracts a tailgate window; and
    a fourth motor that retracts a sunroof,
    wherein the signal generator further activates the third and fourth motors.

12. The system of claim 10, wherein the receiver is connected to a button.

13. The system of claim 1, wherein the input signal is initiated by the user touching a field displayed on a touchscreen.

* * * * *